F. MIZE.
BOLT HOLDER.
APPLICATION FILED DEC. 12, 1919.

1,355,560. Patented Oct. 12, 1920.

Inventor
Frederick Mize.

By Harry C. Schroeder
Attorney.

UNITED STATES PATENT OFFICE.

FREDERICK MIZE, OF OAKLAND, CALIFORNIA.

BOLT-HOLDER.

1,355,560.  Specification of Letters Patent.  Patented Oct. 12, 1920.

Application filed December 12, 1919. Serial No. 344,487.

*To all whom it may concern:*

Be it known that I, FREDERICK MIZE, a citizen of the United States, residing at Oakland, in the county of Alameda and State of California, have invented certain new and useful Improvements in Bolt-Holders, of which the following is a specification.

My invention is an improved bolt holder for engaging the washers on two bolts to hold the bolts against turning so that the nuts may be unscrewed from the bolts.

Referring to the annexed drawing which forms a part of this specification:

Figure 1:
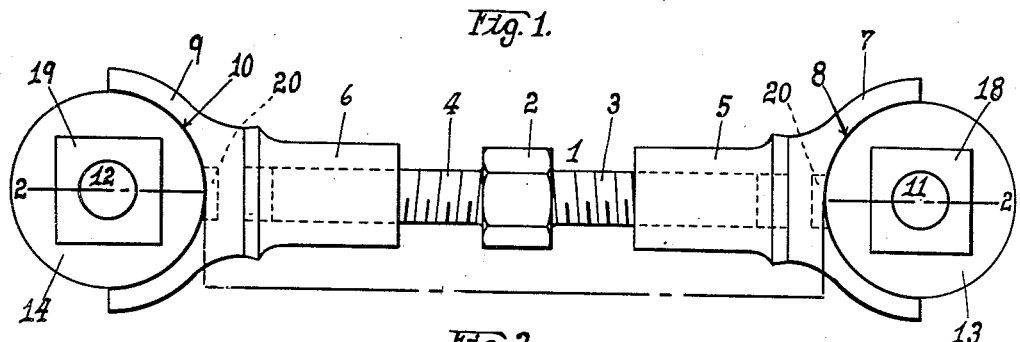
Figure 1 is a plan view of my bolt holder in position holding the washers on two bolts in binding engagement with the bolts, preventing the bolts from turning, the bolts holding two plates together.
Figure 2:
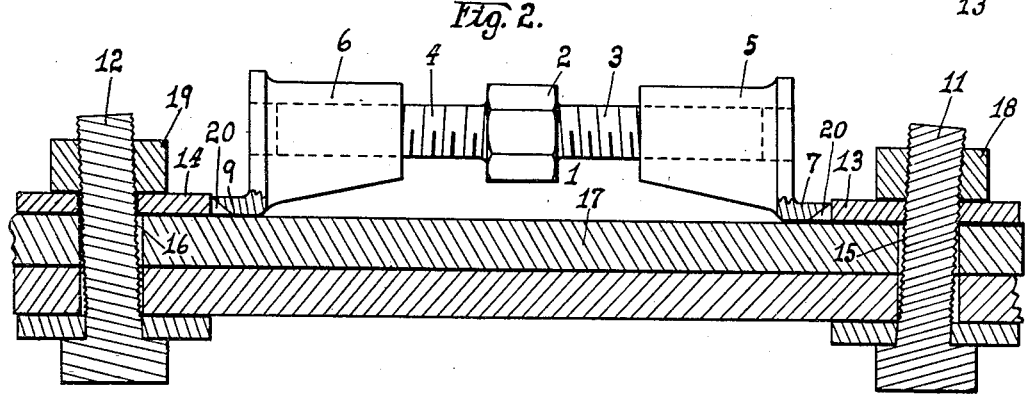
Fig. 2 is a sectional view illustrating my invention taken on line 2—2 of Fig. 1.
Figure 3:
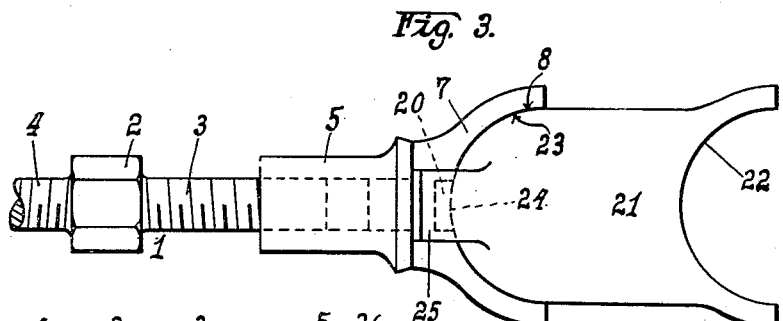
Fig. 3 is a fragmentary plan of my bolt holder with an extension member mounted thereon to enable the holder to hold bolts at a greater distance apart than they are ordinarily spaced.
Figure 4:
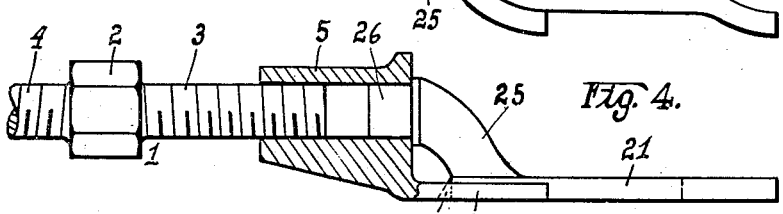
Fig. 4 is a fragmentary part side elevation and part section of my bolt holder as shown in Fig. 3.
Figure 5:
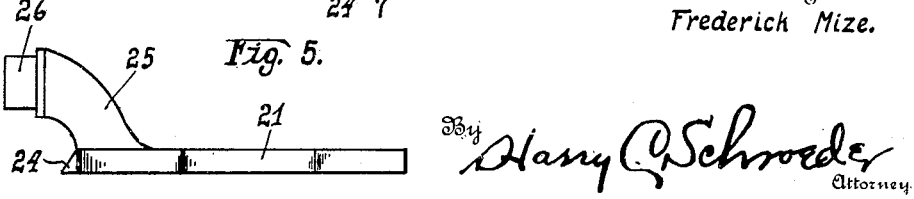
Fig. 5 is a side view of the extension member.

In the drawing 1 indicates a screw on which and intermediate its ends is a wrench receiving member 2. To the right of the member 2 the screw 1 has a right thread 3 and to the left of said member the screw has a left thread 4. An internally threaded sleeve 5 screws onto the right end of screw 1 engaging thread 3. An internally threaded sleeve 6 screws onto the left end of the screw engaging thread 4. On the sleeve 5 is formed a washer engaging member 7 having an arcuate concaved surface 8 for engaging the edge of a washer. On the sleeve 6 is formed a washer engaging member 9 having an arcuate concaved surface 10 for engaging the edge of a washer.

In using my holder I place it between two bolts 11 and 12 and turn the screw 1, by means of a wrench applied to member 2, until the surfaces 8 and 10 of members 7 and 9 engage the edges of washers 13 and 14, and the washers are forced into binding engagement with said bolts and the bolts bent slightly into binding engagement with the upper edge of the bolt openings 15 and 16 in the plate 17, thus holding the bolts against turning. The nuts 18 and 19 may then be unscrewed from the bolts 11 and 12. By reversing the screw 1 the members 7 and 9 are caused to release the washers so that the bolts may be removed. In the surfaces 8 and 10 of the members 7 and 9 in alinement with the screw 1 are undercut notches 20—20.

The effective length of the holder may be extended by the use of an extension washer engaging member 21 which is formed with an arcuate concaved washer engaging surface 22 and a convex end 23 adapted to fit within the surfaces 8 or 10. On the end 23 is formed a tongue 24 shaped to fit the notches 20. From the inner end of the member 21 an arm 25 extends upwardly and rearwardly which carries a rearwardly extending stud 26 which fits in the outer end of the sleeve 5. The engagement of tongue 24 with notch 20 and the fitting of the stud 25 within the sleeve 5 holds the extension member 21 effectively in position on the holder.

Having described my invention, I claim:

1. A bolt holder including a pair of washer engaging members and means for forcing said members into engagement with the washers on two bolts to hold said bolts against turning.

2. A bolt holder including a pair of washer engaging members and a screw having a right and left thread for respectively engaging said members to spread said members apart or to draw said members toward each other.

3. A bolt holder including a pair of washer engaging members formed with arcuate concaved surfaces for engaging the edges of the washers on two bolts, and means for forcing said members into engagement with the edges of said washers.

4. A bolt holder including a pair of washer engaging members formed with arcuate concaved surfaces for engaging the edges of the washers on two bolts, and a screw having a right and a left thread for engaging said members to force said concaved surfaces of said members into engagement with the edges of said washers or to draw said surfaces of said members away from the edges of said members.

5. A bolt holder including a pair of washer engaging members, means for forcing said members into engagement with the washers on two bolts to hold said bolts against turning, and means for increasing the effective length of the holder.

6. A bolt holder including a pair of washer engaging members formed with arcuate concaved surfaces for engaging the edges of the washers on two bolts, oppositely threaded sleeves to which said members are respectively secured, a screw having a right and a left thread for respectively engaging said sleeves to force said members apart or to draw them toward each other, said members being formed with an undercut notch, an extension washer engaging member having a convex end to fit into the concaved surface of said washer engaging members, a tongue on said extension member to fit in one of said notches, and a stud mounted on said extension member to fit in the outer end of one of said sleeves.

In testimony whereof I affix my signature.

FREDERICK MIZE.